United States Patent [19]

Barger et al.

[11] 4,348,574

[45] Sep. 7, 1982

[54] FLUX DAM FOR SUBMERGED ARC WELDING

[75] Inventors: John J. Barger, Ringgold, Ga.; James R. Underwood, Cleveland, Tenn.

[73] Assignee: Combustion Engineering, Inc., Windsor, Conn.

[21] Appl. No.: 159,035

[22] Filed: Jun. 13, 1980

[51] Int. Cl.³ .......................... B23K 9/04; B23K 9/18
[52] U.S. Cl. .............................. 219/73.21; 219/76.14; 219/126; 219/160; 228/215
[58] Field of Search .................... 219/73, 73.1, 73.11, 219/73.2, 73.21, 76.1, 76.14, 126, 160; 228/215, 216

[56] References Cited

U.S. PATENT DOCUMENTS

| | | | |
|---|---|---|---|
| 1,806,954 | 5/1931 | Schmitz, Jr. | 219/160 |
| 2,529,812 | 11/1950 | Peters | 219/73 X |
| 2,638,524 | 5/1953 | Meyer | 219/126 |
| 2,698,891 | 1/1955 | Meyer | 219/126 |
| 2,951,931 | 9/1960 | Danhier | 219/73 |
| 3,207,883 | 9/1965 | Wuesthoff | 219/73 |
| 4,237,361 | 12/1980 | Zwintscher et al. | 219/76.1 |

FOREIGN PATENT DOCUMENTS

| | | | |
|---|---|---|---|
| 1529706 | 10/1978 | United Kingdom | 219/160 |
| 556909 | 5/1977 | U.S.S.R. | 219/76.14 |

Primary Examiner—J. V. Truhe
Assistant Examiner—Keith E. George
Attorney, Agent, or Firm—Arthur L. Wade

[57] ABSTRACT

A dam, or barrier, structure is moved along the edge, or corner, of a workpiece to control the flow limits of molten material of arc welding. The dam structure provides a dimentionally stable groove at the edge of the workpiece surface into which is received granulated flux and positions the body of the flux along the edge, or corner, of the workpiece surface to function as a mold for the molten material, and, thereby, prevent the falling of the flowing material from the surface. The dam structure has the specific form of a continuous tread of segments which advances around parallel rollers to reform the retaining groove structure opposite the arc operation on the surface of the workpiece.

3 Claims, 4 Drawing Figures

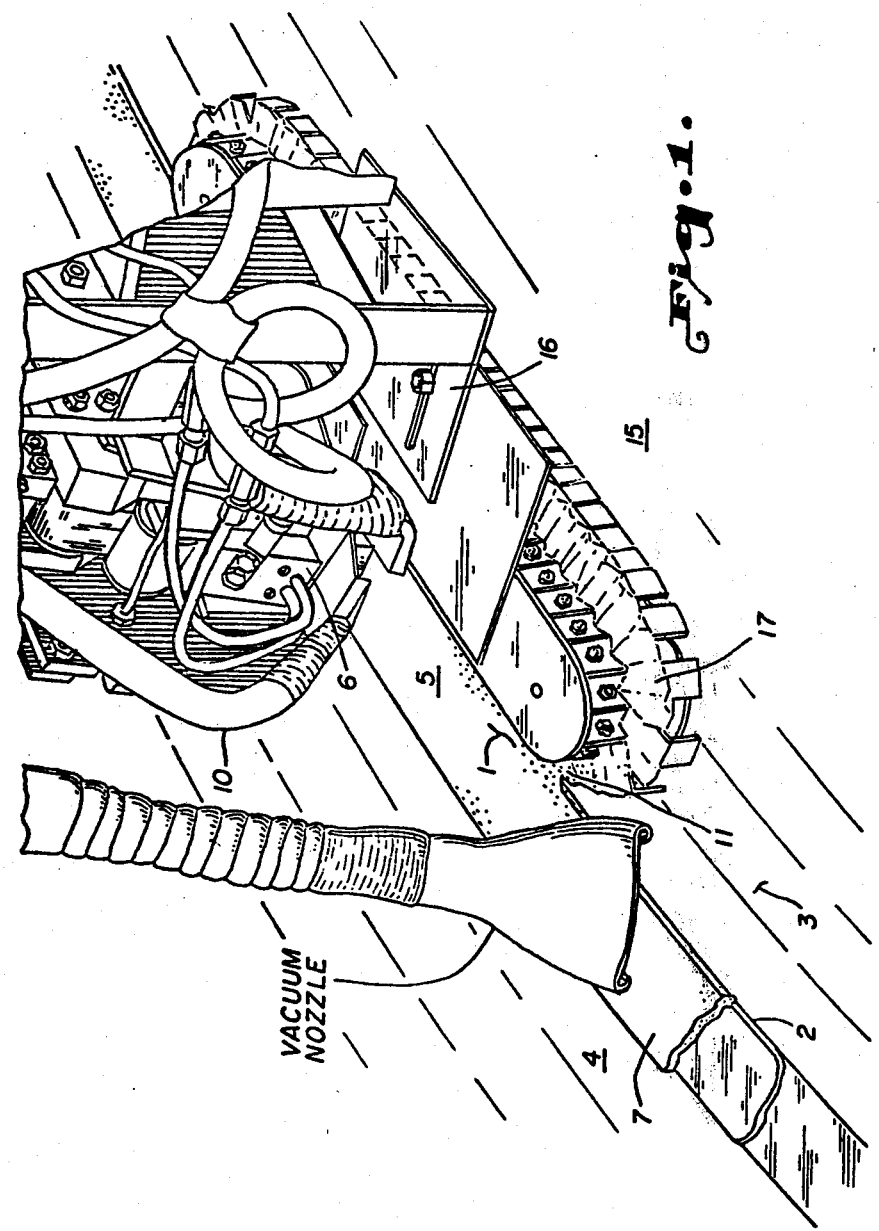

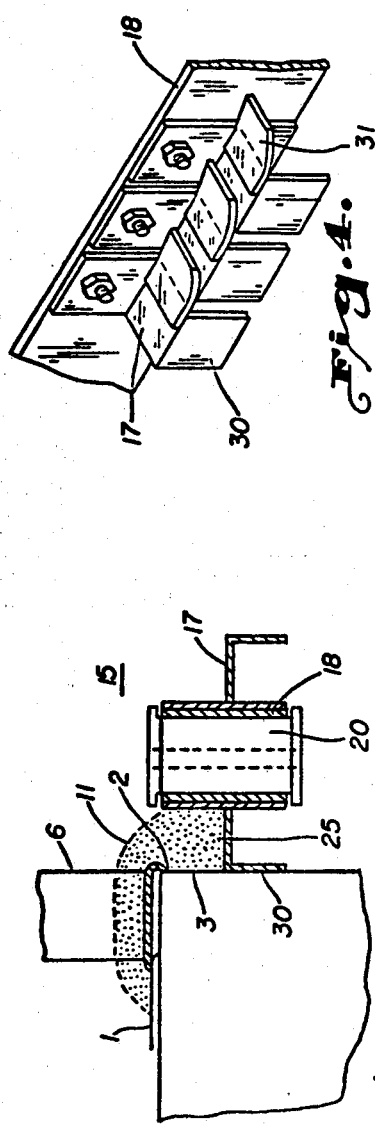
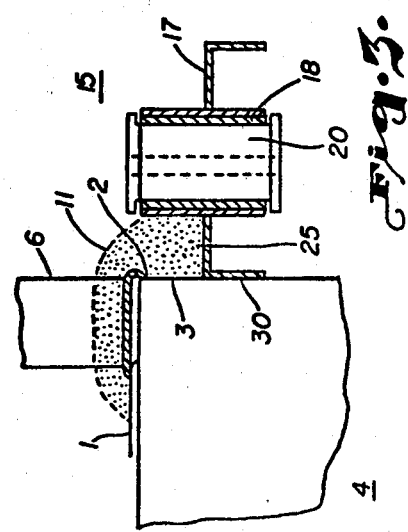
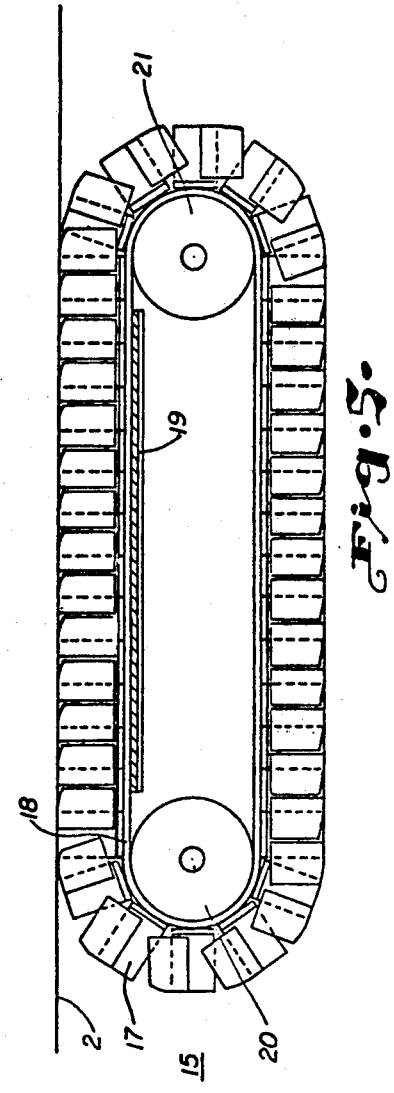

FLUX DAM FOR SUBMERGED ARC WELDING

TECHNICAL FIELD

The present invention relates to structures supporting welding flux burden at the edges of surfaces clad by arc welding to prevent the escape of the molten slag and metal from the workpiece surface. More particularly, the invention relates to a dam structure which is stationary with respect to welding surface, the overall unit moving in cooperation with the welding arc to provide a continuous collection of welding flux to be supported as a continuous mold for the molten slag and metal of the welding arc.

BACKGROUND ART

Arc welding on a horizontal surface inherently presents a problem in retaining the molten slag and metal at the edge of the horizontal surface of the workpiece to form the metal bead flush with the edge. The arc welding process, wherein the molten slag and metal are kept submerged beneath its flux burden, is usually propagated smoothly over horizontal surfaces until the inevitable edge, or corner, of the work surface is reached. It takes little imagination to visualize that when the molten slag and metal, of which the bead is formed, reach the edge of a workpiece surface, the precipitous vertical drop from the edge provides an undesirable path for runoff of both molten slag and metal. A barrier to prevent escape of these materials over the edge of the workpiece is required.

There is no necessity for analysis of the various forms of runoff bars and tabs evolved in the prior art. It is sufficient to describe the present problem of retaining molten slag and metal at the external edge, or corner, of a workpiece.

Not all edges of workpieces are simple, straight lines, and, of course, the length of the edges vary from workpiece to workpiece. There are workpieces with curved edges which also need to be guarded against the escape of molten welding materials until they solidify. Workers in the art have clamped lengths of angle iron along the edges of the surface of the workpiece upon which the flux overburden has collected to provide a mold body for the molten materials of the arc at the workpiece edge.

As simple as the problem is of providing mechanical support for flux at the workpiece edge with a length of angle iron, the speed of production is limited by the preparation of these angle irons of suitable lengths and contours to match the lengths and contours of the workpiece edges.

What is needed, is a dam structure which can be connected to the welding head itself, to move with the arc, providing constant support for a body of flux far enough ahead of the arc to prepare for the continuous molding function, and far enough behind the arc to provide time for welding metal to solidify into its bead. It is not necessary for the dam structure to actually be attached to the welding head; however it is necessary for the two to maintain a common orientation. It simply appears that the welding head would make a convenient station at which the dam structure could be mounted and articulated to cooperate efficiently with the welding operation at the arc. Certainly, the dam, or barrier, structure will have to engage the vertical surface beneath the edge of the working surface to form retention structure for the flux overburden. It is highly desirable that the engagement between the dam structure and the vertical surface not result in sliding the structures over each other. A sliding movement would cause flux movement which must be stationary with respect to the molten slag and metal, while the metal is solidifying into its bead form.

DISCLOSURE OF THE INVENTION

The present invention contemplates a continuous belt on which is mounted segment bodies formed into a tread which are brought into contact with the vertical edge of a workpiece and shaped and cooperated to provide a recess at the edge of the workpiece which will receive granular flux overburden and hold the material as a body at and above the level of the surface beneath the welding arc in functioning as a mold for the molten materials generated at the arc.

The invention further contemplates that the plurality of segments formed in a horizontal assembly on the continuous belt around parallel rollers, which are connected to the welding head, will engage the vertical surface to actuate the belt by frictional engagement.

Other objects, advantages, and features of the invention will become apparent to one skilled in the art upon consideration of the written specification, appended claims and accompanying drawings.

BRIEF DESCRIPTION OF THE DRAWINGS

FIG. 1 is a perspective view of a welding head operatively engaging a workpiece surface and supporting a rotary dam which embodies the present invention;

FIG. 2 is a plan view of the dam of FIG. 1;

FIG. 3 is a sectioned elevation of the dam and workpiece of FIG. 1;

FIG. 4 is an isometric of contiguous belt segments to disclose their relation to each other.

BEST MODE FOR CARRYING OUT THE INVENTION TERMINOLOGY

As the invention is embodied in relatively simple structure, disclosed in the drawing figures, it is more than usually important that there be no inconsistency in the terminology peculiar to the welding art. The reader is assumed to be well acquainted with the submerged arc welding process. Therefore, the terminology developed by this disclosure must be understood in its relation to arc welding.

A consumable electrode conducts a large value of electrical current through the welding head to sustain an arc to the surface of the workpiece. The body of the advancing electrode becomes molten in the heat of the sustained arc and is deposited as a bead on the workpiece surface.

The arc is sustained beneath a continuously supplied body of flux. The composition of the flux may vary, as well as the composition of the consumable electrode. Whatever its composition, the flux is usually in the form of granuals which flow from their supply, much as sand would flow. The granular flux, flowing down over the arc, is referred to as the flux burden of the arc and basically functions to exclude the atmosphere from the welding process. Of course, not all of the flux is consumed at the arc. Surplus flux which can be reclaimed is recycled through an appropriately positioned vacuum system.

Any mechanical structure positioned relative to the workpiece surface to block the flow of the molten materials of the arc, is termed a dam. As a barrier, or flow-blocking structure, the dam controls the distribution of the molten flux which, in turn, controls the molten metal of the consumable electrode.

The essential elements of the present invention are embodied in the structural configuration of the dam. To form the embodying dam of the present invention, a series of segments in the form of blocks, usually of metalic material, are mounted on a belt loop which is guided on two parallel rollers. Given the straight-run of the block segments between the rollers and the separation necessary between the segments as the belt travels around each roller, the general appearance of the combination is reminiscent of the caterpillar tread of tractors.

It is to be understood at the outset that the continuous caterpillar tread shaped dam is preferably mounted, and supported on, the welding head. Thus, the dam is an attachment to the welding head, which is positioned relative to the arc, sustained by the electrode depending from the welding head. The caterpillar tread dam is actuated as it travels with the welding arc and continuously functions in control of the molten materials of the arc.

GENERAL ORIENTATION OF STRUCTURE

To disclose the invention in its proper breadth, FIG. 1 shows a generalized form of a work surface 1. Work surface 1 is extended in substantially a horizontal plane only to dramatize that the bead laid down by a welding process is most conveniently controlled by gravity on the horizontal surface as it solidifies. Of course, work surface 1 need not be absolutely flat or absolutely horizontal. What is significant, is the fact that the present invention deals with the problem as, inevitably, edge 2 of work surface 1 is reached. Presumably, there is a precipitous vertical drop from edge 2 along wall 3 of workpiece 4.

Workpiece 4 can take many different forms. It will serve no purpose of the disclosure to contemplate many different forms for workpiece 4. The workpiece may take the form of a thick-walled cylinder, and it may be required to clad the inside surface of this cylinder, as well as the ends of the thick wall of the cylinder. The cylindrical workpiece would be held and moved to orient the internal wall being clad to apply the weld over the curved surface as the wall is rotated beneath the welding head. If the cladding is required on the ends of the thick walls, the cylinder would be held in a vertical position so the surface provided by the thick wall would be held horizontally beneath the welding head. In both events, the embodiment of the present invention can be adapted to function in control of the molten welding bead at the edges of these surfaces.

To adequately disclose the present invention, it is sufficient to show a flat work surface 1 with its edge 2 and vertical surface 3 of the workpiece 4. A welding head 5, supported by mechanism not shown, lays down molten beads from consumable electrode 6 on this flat work surface 1 as a cladding.

Head 5 is disclosed as it clads surface 1 with parallel, and contiguous beads 7. The last of these beads is that at the edge 2. It is in laying this last bead that the present problem descends.

The welding arc of the process generates molten material which flows over the surface 1. When this molten material is generated close enough to edge 2 in forming the last bead 7, some of the molten material will flow over edge 2 if not stopped by a barrier, or dam. It is at this point that the present invention moves to center stage.

The history of controlling the molten metal and flux of the welding arc at the edges of work surfaces will not be reviewed in detail. Various elongated shapes of material have been clamped to work surface edges, represented by edge 2, to provide a horizontal barrier, or dam, which limits the bead material in its molten state so it will solidify flush with the edge 2. It is pointed out that cutting, fitting, and clamping barrier structures to work surface edges has been a jury-rigged system at best. The present invention solves this problem and provides uniform results in bringing the cladding material up to edge 2 with a most expeditious function.

FIG. 1 essentially discloses the submerged arc welding process as sustained by welding head 5 depending its tongue of metalic electrode 6 down toward surface 1 until the large electrical current supplied the electrode spans the gap between the end of the electrode and the grounded work surface to form an arc whose heat consumes the steadily advanced electrode. It is necessary to exclude the atmosphere from the arc, and an overburden of flux is supplied for this purpose.

A hopper, not shown, is a supply of flux in granulated form. Conduit 10 is disclosed as leading from the hopper overhead to direct the flux down over the arc. Many suitable connections can be made with the hopper for the flux to flow, after the fashion of sand, down over the arc and literally submerge the arc as it lays down its bead 7. Conduit 10 embodies and represents these connections.

The composition of the flux need not be disclosed. Various materials are employed, some of which may be used to form an alloy with the molten material of the electrode. Regardless of variations, the primary function of flux is to exclude the atmosphere from the molten body of the electrode.

The flux is supplied in excess. It is planned for a portion of the flux to be melted by its contact with the molten electrode metal and flow with the molten metal. This slag will solidify in a carapace over the bead and can be subsequently removed with relative ease. Substantially all of the remaining flux which does not become slag can be subsequently vacuumed away from the workpiece surface and cycled to the hopper in recovery.

The present invention utilizes the excess flux by catching it with the embodying structure of the invention to form a body 11 at the edge 2. The granulated flux has been described as flowing like sand. It is directed here to flow into the retaining structure provided by the inventive embodiment in a position to function like foundry-molding sand for the molten materials of the arc. Thus, enough welding flux is supplied along edge 2 to form a body 11 at edge 2 which will function as a barrier, or dam, for the molten materials generated by the arc. The result is a solidification of the metalic bead flush with edge 2.

In FIG. 1, the general orientation of dam 15 is shown as it is held at edge 2. Subsequent drawing figures will show details of dam 15. In FIG. 1, dam 15 is shown as held at edge 2, and articulated by contact with the surface of vertical wall 3, by attachment to the same apparatus that comprises welding head 5. Specifically, plate 16 is the connecting link between dam 15 and the head 5 structure.

Dam 15 is a combination of parts actuated to bring a series of segments 17 into a predetermined position upon wall 3 and at edge 2. Segments 17 are individually attached to an endless belt 18, and the belt being extended between two parallel rollers which will be viewed in subsequent drawings. The belt 18, with its attached segments 17 is articulated to rotate because of the friction between the faces of segments 17 and wall 3. The complete dam assembly 15 is moved parallel to wall 3 while the faces of segments 17 are held in frictional engagement with wall 3. Rotation of the belt 18 results in a continuous line of segments 17 being presented in a predetermined spatial relationship to edge 2.

Belt 18 is flexible in order to travel around rollers of the dam 15. In order to bring the segments 17 against the surface of vertical wall 3, a backup plate 19 is mounted behind belt 18 and supported to apply pressure to the back of belt 18 so that its segments 17 will engage surface 3 with predetermined force.

With dam 15 connected to head 5, the welding arc is held opposite the aligned segments 17 of dam 15. The segments 17 are shaped to provide a groove, or trough, along wall 3 and below edge 2 where flux from conduit 10 will be deposited as a body 11. The general result is, that enough flux will be deposited in the groove, provided by dam 15, to continuously form the body of flux which will function as a barrier at the edge 2 to control the molten materials of the arc and prevent their falling down the vertical wall face 3.

DAM 15 FROM ANOTHER VIEW

In FIG. 2, the disclosure of dam 15 benefits by removing the dam from the environment of FIG. 1 and looking down upon its structure. The segments 17 can be seen in their attachment to belt 18. More importantly, the parallel rollers 20, 21 can more clearly be seen in their relation to belt 18. FIG. 1 discloses these rollers held in rigid relationship to each other, but the plate holding the rollers has been removed in FIG. 2 in order to view the belt 18, and pressure plate 19, about the rollers more clearly.

Edge 2 of workpiece 4 is indicated to emphasize that the vertical faces of segments 17 engage the vertical face of the workpiece. As the dam is moved parallel to wall 3, the belt, and its attached segments, is articulated to maintain a desired number of segments 17 along edge 2 in forming the groove, or recess, which will receive the flux from conduit 10. The basic teaching is that the dam 15 thus provides a structure which moves with the welding arc while providing the all-important groove, or recess, stationary relative to the workpiece to hold the body of flux up to edge 2.

DAM 15 FROM STILL ANOTHER VIEWPOINT

With FIG. 3, the dam is disclosed in its functional position relative to vertical wall 3 of workpiece 4 and edge 2 of work surface 1. In this elevation, segments 17, held against vertical wall 3, are viewed down the row they form to create the groove, or recess, 25. It is this groove, or recess, 25 which will receive flux in front of the welding arc and form a body 11.

The delivery system, represented by conduit 10, is not shown in FIG. 3. The present disclosure assumes that the proper amount of flux to form body 11 has been delivered to both submerge the welding arc at electrode 6 and fill groove 25 to the height which will position body 11 as a mold to maintain the molten materials of the arc substantially flush with the vertical wall 3.

Each of segments 17 has a face 30 which is brought against vertical surface 3 as the belt is articulated. The material for the segments 17 is selected and formed to have a coefficient of friction with wall 3 which will cause belt 18 to articulate around rollers 20, 21.

The attachment of segments 17 to belt 18 can be selected from any number of suitable mechanical fasteners. Taking into account the general conditions of service, and the heat in the environment for the dam, belt 18 can be formed of suitably rugged material, probably some material including a high rubber content for flexibility.

The elevation of FIG. 3 shows the profile of segments 17 naturally generating the term "chair-like" to describe the segments. Therefore, it is the bottom and back of this chair-like segment which is positioned with the top of wall 3 to form the groove, or recess, 25.

It is assumed that there is a regulatory system for the delivery of the flux to the welding arc which will provide an excess of this flux for groove 25 to form body 11 of the size which will form the mold for the molten materials at the welding arc. The end result is, that the body 11 will have the height and density at the edge 2 which will form an effective barrier for the molten materials of the welding arc to confine them to the edge until they become solid and self-supporting.

FIG. 4 has been added to disclose the solution to the particular problem of controlling the sand-like flux as it rests on the bottom of the groove 25. The chair-like segments 17 are lined up with each other at the edge 2 by their attachments to belt 18. Structure is required to prevent the sand-like flux from working its way down between the abutting edges of the segments 17. FIG. 4 is established to disclose this structure.

In FIG. 4, a plate structure 31 is attached to each segment 17 on its "seat" to extend over the crack between its side and the abutting side of an adjacent segment 17. Arranged, formed, and attached to its segment 17, plate 31 is an effective cover for the cracks between segments at the bottom of groove 25. The results is, that the sand-like flux will not accumulate in the cracks between segments and cause eventual misalignment of the segments as they are attached to belt 18.

CONCLUSION

Although it does not bear close inspection and comparison, from this angle, the dam 15 has a superficial connotation of the tread of the caterpillar tractor. With the faces 30 of its segments 17 forced against the surface of workpiece face 3, the combination is articulated to give the pale imitation of a caterpillar tractor tread. However, its comparison to the caterpillar tread does not appear to directly further the disclosure of the invention to a material degree.

It is important to note that the present disclosure teaches the articulation of the dam by engagement between segments 17 and the wall 3. However, it is to be understood that a motor, geared to one, or both, rollers 20, 21 could also power the articulation with the resulting travel of the dam along wall 3.

The present disclosure does not pretend to solve all the problems in operating the structure disclosed. In reduction to practice of the invention, itself, it is basically evident from the drawings and description of them. However, the problem of controlling the flux flow is not a part of this disclosure. Also, the collection of the flux from the trail of the welding arc and dam is only indicated by the intake nozzle of a vacuum system disclosed in FIG. 1. It seems apparent that this vacuum nozzle could be positioned at an appropriate station behind the welding arc and dam to pick up loose and excess flux and return it to the hopper feeding conduit 10.

The bottom line of the disclosure remains in providing a structure to hold a body of flux to the edge of a workpiece so that the body will act as a dam, or barrier, to the molten materials of arc welding. So positioned, the flux acts as a molding sand to stabilize the molten material at the edge of the workpiece and prevent its falling from the edge. More specifically, the bead of the welding process is formed substantially flush with the workpiece edge.

From the foregoing, it will be seen that this invention is one well adapted to attain all of the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

We claim:

1. A system for welding cladding on a horizontal surface of a workpiece, including,
   a workpiece oriented to have a surface extended substantially horizontal,
   an arc welding head oriented relative to the horizontal work surface describing a track over the surface to lay down a bead of metal on the surface of the workpiece along an edge of the surface above a side of the workpiece,
   a dam in the form of a series of abutting segments with each segment having a profile of chair-like configuration which segments are connected through their backs to a continuous belt while the front of the segments are brought into frictional engagement with the side of the workpiece below the edge to form a groove below the horizontal surface of the workpiece at the location along which the arc welding head lays down its bead,
   and a supply of flux in granular form directed to flow as an overburden of the arc and between the dam and the workpiece,
   whereby, the flux between the dam and the workpiece is positioned to function as a molding body to limit the molten materials of the welding process and form a bead substantially flush with the edge of the substantially horizontal work surface.

2. The system of claim 1, including,
   a plate structure attached to the bottom of each chair-like segment and extending over the crack between the segment's side and the side of the abutting adjacent segment to prevent the accumulation of the flux in the crack.

3. The system of claim 1, including,
   a spring body shaped and arranged to bear upon a finite length of the belt to exert a predetermined force upon a plurality of the segments brought into contact with the side of the workpiece below the edge.

* * * * *